Oct. 30, 1923.                                                              1,472,721
                              I. LEIKER
                    SLOT CLOSURE FOR FORD AUTOMOBILES
                         Filed Dec. 11, 1922
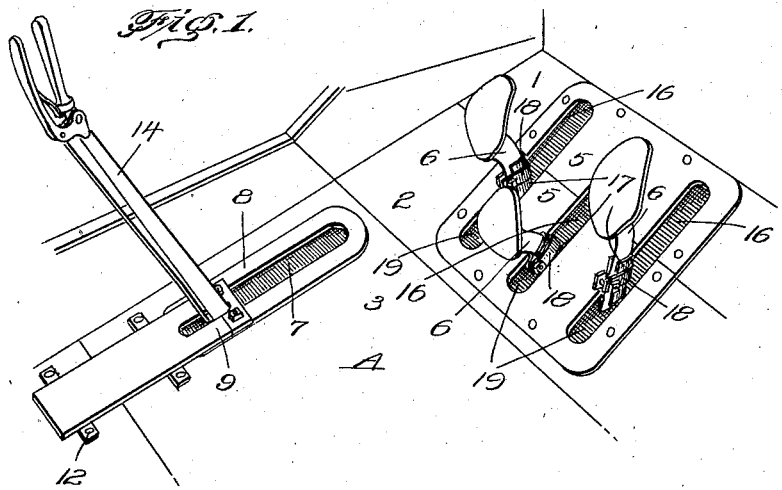
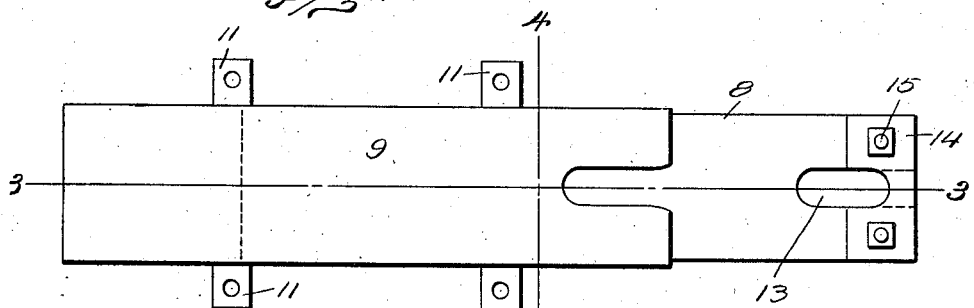
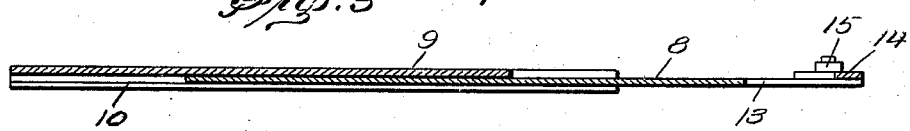
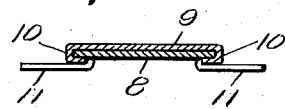
INVENTOR.
Isadore Leiker.
BY
Geo. P. Kimmel.   ATTORNEY.

Patented Oct. 30, 1923.

1,472,721

UNITED STATES PATENT OFFICE.

ISADORE LEIKER, OF HAYS, KANSAS.

SLOT CLOSURE FOR FORD AUTOMOBILES.

Application filed December 11, 1922. Serial No. 606,136.

*To all whom it may concern:*

Be it known that I, ISADORE LEIKER, a citizen of the United States, residing at Hays, in the county of Ellis and State of Kansas, have invented certain new and useful Improvements in Slot Closures for Ford Automobiles, of which the following is a specification.

This invention relates to slot closures for Ford automobiles, and its object is to provide a means for preventing a draught in winter time and to shut off the hot air from the engine in the summer time.

The invention comprises a slide member with a slotted guard plate through which the emergency brake lever passes and which slide participates in the movement of the brake lever as it is operated.

In addition to the brake lever slide or guard plate, there are three other guard plates, one for each of the control levers of the automobile.

The construction is such that the guards may be removed at any time or applied at any time to effectively protect the operator from the hot air or from the draughts to which the operator is subjected.

The invention will be best understood from a consideration of the following detailed description taken in connection with the accompanying drawings forming part of this specification, with the understanding that the invention is not confined to any strict conformity with the showing of the drawings, but may be changed and modified so long as such changes and modifications mark no material departure from the salient features of the invention as expressed in the appended claims.

In the drawings:—

Figure 1 is a perspective view of the driver's compartment in the automobile, showing the various levers and their guard plates in place.

Fig. 2 is a plan view of the guard plate provided for the emergency brake lever.

Fig. 3 is a longitudinal section on the line 3—3 of Fig. 2.

Fig. 4 is a cross section on the line 4—4 of Fig. 3.

Referring to the drawings, there is shown in Fig. 1 the driver's compartment A of a Ford automobile with the usual equipment of floor boards 1, 2 and 3 with which the compartment is equipped so that no special description of these floor boards is necessary.

The boards 1 and 2 are provided with longitudinal slots 4 with the usual guard plates 5 with which they are customarily provided to withstand the wear of the pedals 6 of which there are three in the ordinary Ford automobile for controlling the clutch, the reverse, and the brake.

The floor board 3 is provided with a front to rear slot surrounded by a two part guard plate or frame 8, 9, joined end to end as shown in Figs. 2 and 3, the plate 8 being shaped to slide in the plate 9 and the margins 10 of the plate 9 being formed at the edges with turned over margins 10 so as to serve as guides for the plate 8.

The plate 9 is formed at the opposite edges with ears 11 for the passage of screws or rivets 12 by means of which the marginal plate 9 is made fast to the floor board 3.

One end of the plate 8, which is an elongated plate, is formed with slots 13 of a size to snugly pass the emergency brake lever 14 so that the plate 8 will participate in movements of the emergency brake lever 14 and the extremity of the plate 8 is provided with a slotted strip 14 covering the slot 13 and held to the plate 8 by bolts 15 or otherwise.

The presence of the bolts 15 permit the removal of the holding strip 14 when it is desired to take off the plate 8 and thus release the emergency brake lever 14.

The arrangement of the slot closures for the Ford automobile is such that draughts either of cold air or of hot air are avoided at all times.

The structure is such that it may be applied to the Ford automobile without any change whatever therein and at the same time producing a protection to the user from the effects of hot air in the summer time and cold draughts in the winter time.

What is claimed is:—

1. A closure for the clearance slot of a controlling element of a motor vehicle comprising a fixed plate positioned to extend across a portion of the clearance slot and having its forward end slotted for the passage of the controlling element, a closure plate slidably connected to said fixed plate and normally extending across said clearance slot for closing a portion thereof, said slidable plate having its forward end slotted for the reception of the controlling element, and means mounted on the slotted end of the slidable plate for connecting the controlling element therewith, said fixed plate having the longitudinal marginal portions thereof inturned to provide for slidably connecting the other plate therewith.

2. A closure for the clearance slot of a controlling element of a motor vehicle comprising a fixed plate positioned to extend across a portion of the clearance slot and having its forward end slotted for the passage of the controlling element, a closure plate slidably connected to said fixed plate and normally extending across said clearance slot for closing a portion thereof, said slidable plate having its forward end slotted for the reception of the controlling element, means mounted on the slotted end of the slidable plate for connecting the controlling element therewith, said fixed plate having the longitudinal marginal portions thereof inturned to provide for slidably connecting the other plate therewith, and oppositely extending apertured ears carried by said fixed plate and providing means for the passage of hold-fast devices for securing said fixed plate stationary.

In testimony whereof, I affix my signature hereto.

ISADORE LEIKER.